(12) United States Patent
Tsumori

(10) Patent No.: US 6,463,973 B1
(45) Date of Patent: Oct. 15, 2002

(54) VEHICLE TIRE INCLUDING WIDE CARBON BLACK REINFORCED RUBBER PARTS AND NARROW SILICA REINFORCED RUBBER PARTS

(75) Inventor: Isamu Tsumori, Amagasaki (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 37 days.

(21) Appl. No.: 09/612,547

(22) Filed: Jul. 7, 2000

(30) Foreign Application Priority Data

Jul. 8, 1999 (JP) .......................... 11-194796

(51) Int. Cl.[7] .............................. B60C 1/00; B60C 11/00
(52) U.S. Cl. ................................. 152/209.5
(58) Field of Search .................. 152/152.1, 154.2, 152/209.5, DIG. 2

(56) References Cited

U.S. PATENT DOCUMENTS

| | | | |
|---|---|---|---|
| 2,254,622 A | * | 9/1941 | Overman |
| 2,272,891 A | * | 2/1942 | Coben |
| 2,294,626 A | * | 9/1942 | Overman |
| 4,226,274 A | * | 10/1980 | Awaya et al. |
| 4,478,266 A | * | 10/1984 | Pierson et al. ........... 152/209.5 |
| 6,269,854 B1 | * | 8/2001 | Matsuo et al. ........... 152/209.5 |

FOREIGN PATENT DOCUMENTS

| | | | |
|---|---|---|---|
| DE | 2503709 A | | 8/1976 |
| EP | 0 847880 A1 | | 6/1998 |
| EP | 864447 | * | 9/1998 |
| EP | 950506 | * | 10/1999 |
| GB | 506142 A | | 5/1939 |
| GB | 2265586 | * | 10/1993 |
| JP | 61-146605 | * | 7/1986 |
| JP | 11-151908 | * | 6/1999 |
| JP | 2000-79805 | * | 3/2000 |

* cited by examiner

Primary Examiner—Steven D. Maki
(74) Attorney, Agent, or Firm—Birch, Stewart, Kolasch & Birch, LLP

(57) ABSTRACT

A vehicle tire comprises a tread rubber forming a ground contacting face of the tire; in a range from the ground contacting face to a certain depth, the tread rubber comprising circumferentially extending wide parts made of a carbon-black-reinforced rubber composition and circumferentially extending narrow parts made of a silica-reinforced rubber composition, which wide parts and narrow parts alternate in the tire axial direction; the axial width of each narrow part being in the range of from 0.5 to 1.5 mm; and the number of the narrow parts counted across a ground contacting width of the ground contacting face being in a range of from 3 to 11.

10 Claims, 3 Drawing Sheets

VEHICLE TIRE INCLUDING WIDE CARBON BLACK REINFORCED RUBBER PARTS AND NARROW SILICA REINFORCED RUBBER PARTS

The present invention relates to a vehicle tire, more particularly to an improved tread rubber suitable for pneumatic tires which is capable of improving dry grip performance and wet grip performance.

In recent years, a tire whose tread rubber is reinforced mainly by silica instead of conventional carbon black has been proposed in order to improve the rolling resistance and wet: grip performance of the tire.

The silica-reinforced rubber has a low energy loss property, suppleness and suitable adhesiveness to the wet road surface. Thus it can improve the rolling resistance and wet grip performance.

In such a tread rubber, however, dry grip performance inevitably decreases. Therefore, a lot of effort was put into finding a combination of a silica content and a carbon black content by which a good balance of dry grip performance and; wet grip performance can be obtained.

However, if the silica content exceeds a certain value, the silica hinders the carbon black from displaying its full function. Further, if the carbon black content exceeds a certain value, the carbon black hinders the silica from displaying its full function. Therefore, there are limits to improving the dry grip performance and wet grip performance by adjusting the silica content and carbon black content.

It is therefore, an object of the present invention to provide a vehicle tire of which dry grip performance, wet grip performance and the like are effectively improved by avoiding the above-mentioned problems.

According to the present invention, a vehicle tire comprises
a tread rubber which forms a ground contacting face of the tire,
the tread rubber, in a range from the ground contacting face to a certain depth, comprising circumferentially extending wide parts made of a carbon-black-reinforced rubber composition and circumferentially extending narrow parts made of a silica-reinforced rubber composition, which wide parts and narrow parts alternate in the tire axial direction,
the axial width of each of the narrow parts being in the range of from 0.5 to 1.5 mm, and
the number of the narrow parts counted across a ground contacting width of the ground contacting face being in a range of from 3 to 11.

Embodiments of the present invention will now be described in detail in conjunction with the accompanying drawings.

Figure 3A:
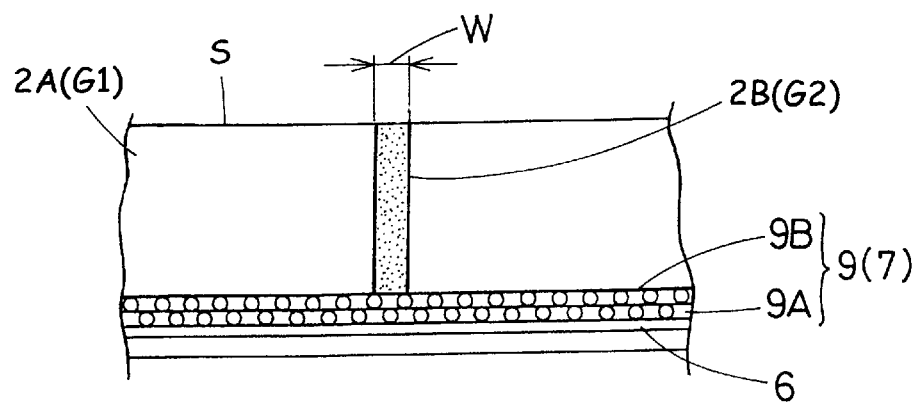
Figure 3B:
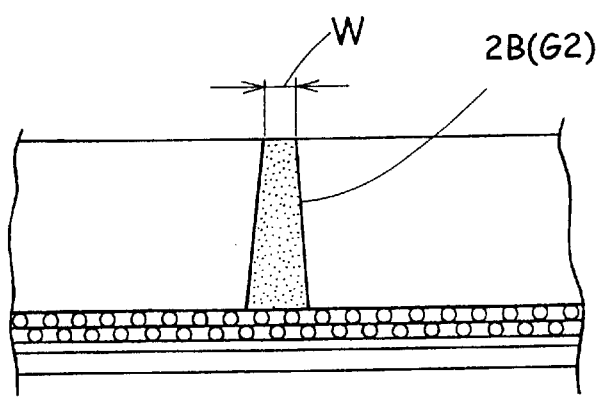
Figure 3C:
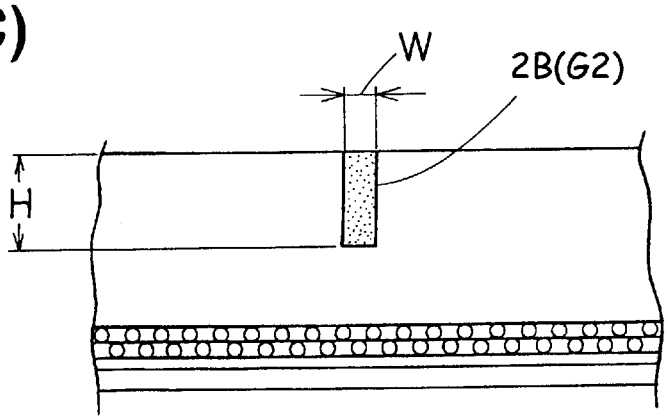

FIGS. 3(A), 3(B) and 3(C) are cross sectional views showing examples of the narrow part.

Figure 1:
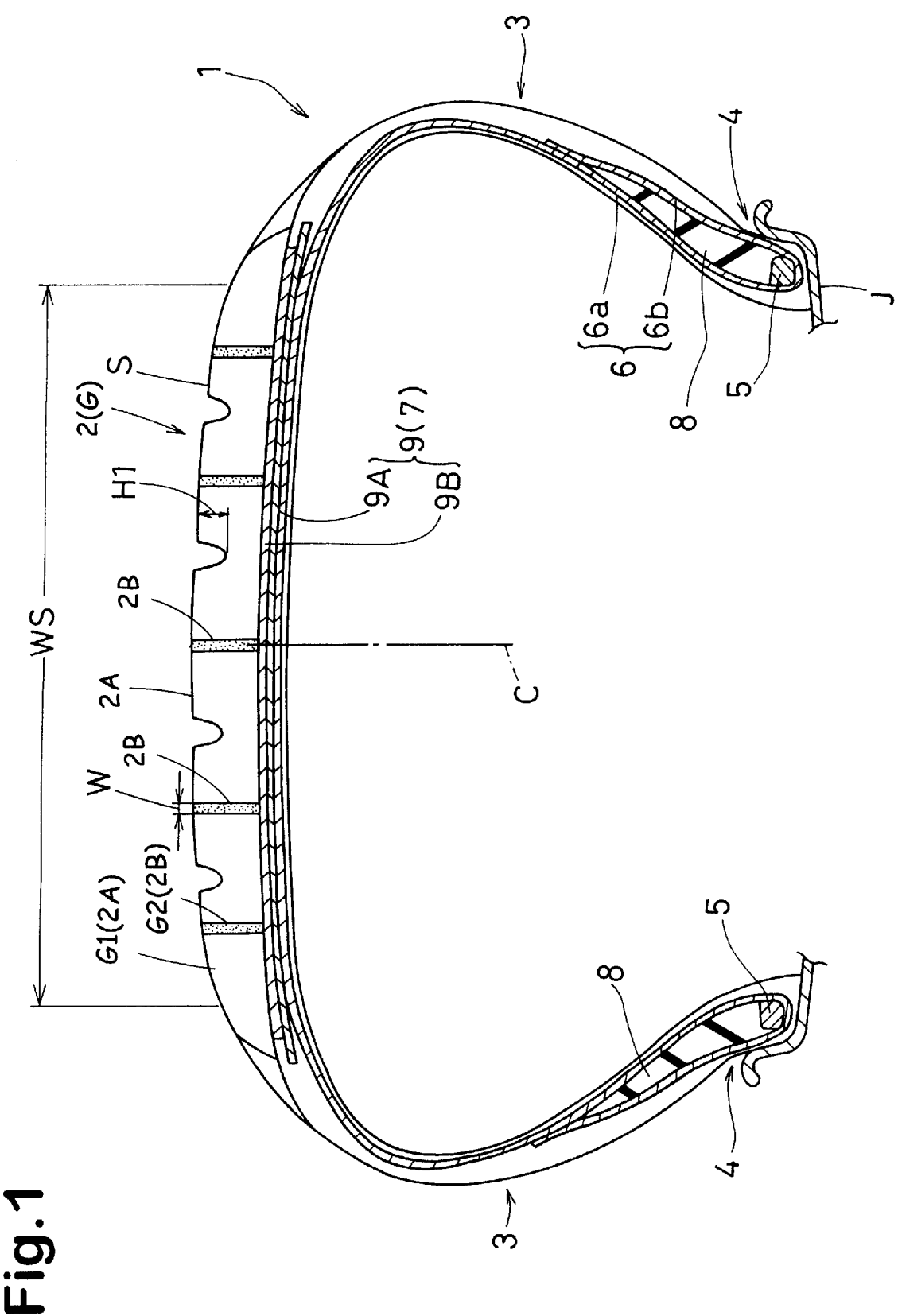
FIG. 1 is a cross sectional view of an embodiment of the present invention.

In FIG. 1 tire 1 according to the present invention is a pneumatic radial tire for passenger cars. The tire 1 comprises a tread portion 2, a pair of sidewall portions 3, a pair of bead portions 4 each with a bead core 5 therein, a carcass 6 extending between the bead portions 4 and turned up around the bead cores 5, and a belt 7 disposed radially outside the carcass 6 in the tread portion 2.

The carcass 6 comprises at least one ply, in this example only one ply of cords arranged an angle of 75 to 90 degrees with respect to the tire equator C. For the carcass cords, organic fiber cords, e.g. nylon, polyester, rayon, aromatic polyamide and the like and steel cords can be used.

The belt 7 comprises a breaker 9 and optionally a band disposed radially outside the breaker 9.

The breaker 9 in this example comprises two cross plies 9A and 9B of parallel cords laid at an angle of 15 to 40 degrees with respect to the tire equator C. For the breaker cords, steel: cords and high modulus organic fiber cords such as aromatic polyamide and the like can be used.

The band comprises at least one cord wound at an angle of from 0 to 5 degrees with respect to the tire equator C. For example, the band is made of a spirally wound nylon cord. The band covers at least the axial edges of the breaker 9. In each of the bead portions 4, a hard rubber bead apex 8 is disposed between the turned up portion 6b and the main portion 6a of the carcass 6.

In the tread portion 2, a tread rubber G is disposed: radially outside the belt 7 to define a tread face S or the ground contacting face S of the tire.

The tread rubber G is made up of a carbon-black-reinforced rubber compound G1 and a silica-reinforced rubber compound G2 which appear on the tread face S alternately in the tire axial direction.

The carbon-black-reinforced rubber compound G1 is used for improving the dry grip performance. The silica-reinforced rubber compound G2 is used for improving the wet grip performance.

The carbon-black-reinforced rubber composition G1 comprises a base rubber material and a reinforcing agent.

As to the reinforcing agent, at least 60 weight % thereof, preferably more than 70%, more preferably more than 80%, still more preferably more than 90%, more preferably substantially 100% is a carbon black. Thus, it is possible that the reinforcing agent includes a small percentage of silica in addition to the carbon black.

The average particle diameter Nc of the carbon black is preferably not more than 30 nm. Thus, hard carbon blacks—SAF, ISAF, HAF are preferably used.

For the base rubber material, diene rubbers, that is, natural rubber (NR), butadiene rubber (BR), styrene butadiene rubber (E-SBR and S-SBR), synthesis polyisoprene rubber (IR), nitrile rubber (NBR), chloroprene rubber (CR) and the like can be used alone or in combination.

The loss tangent (tan $\delta$) of the carbon-black-reinforced rubber composition G1 is not less than 0.200 at a temperature of 70 degrees C. and a peak temperature at which the loss tangent (tan $\delta$) becomes maximum is set in a range of from $-10$ to $-30$ degrees C. For the rolling resistance and the like, the loss tangent (tan $\delta$) is preferably limited to not more than 0.300. Here, the loss tangent (tan $\delta$) is measured with a viscoelastic spectrometer made by IWAMOTO SEISAKUSYO under an initial elongation of 10 %, amplitude of dynamic strain of $\pm 1\%$, and frequency of 10 Hz.

In this example, in order that the loss tangent (tan $\delta$) becomes not less than 0.200, the rubber composition G1 comprises at least 50 parts by weight of the carbon black with respect to 100 parts by weight of the base rubber material.

On the other hand, the silica-reinforced rubber composition G2 comprises 100 parts by weight of a base rubber material, 30 to 100 parts by weight of silica and 3 to 20 parts by weight of carbon black.

For the base rubber material, diene rubbers explained above can be used.

Preferably, the silica has a BET surface area, as measured using a nitrogen gas adsorption, in a range of from 150 to 250 sq.m/g and a dibutylphthalate (DBP) oil absorption value in a range of not less than 180 ml/100 g. For the rubber reinforcing effect and rubber processability, a silica which has a colloidal characteristic is preferably used.

In the carbon-black-reinforced rubber composition G1 and silica-reinforced rubber composition G2, commonly used additive materials, such as vulcanizing agents, vulcanization accelerator, auxiliary vulcanization accelerator, plasticizer, age resistor, oil, silane coupling agents and the like may be added.

In Table 2, examples of rubber compositions which were used in comparison tests are shown.

Figure 2:
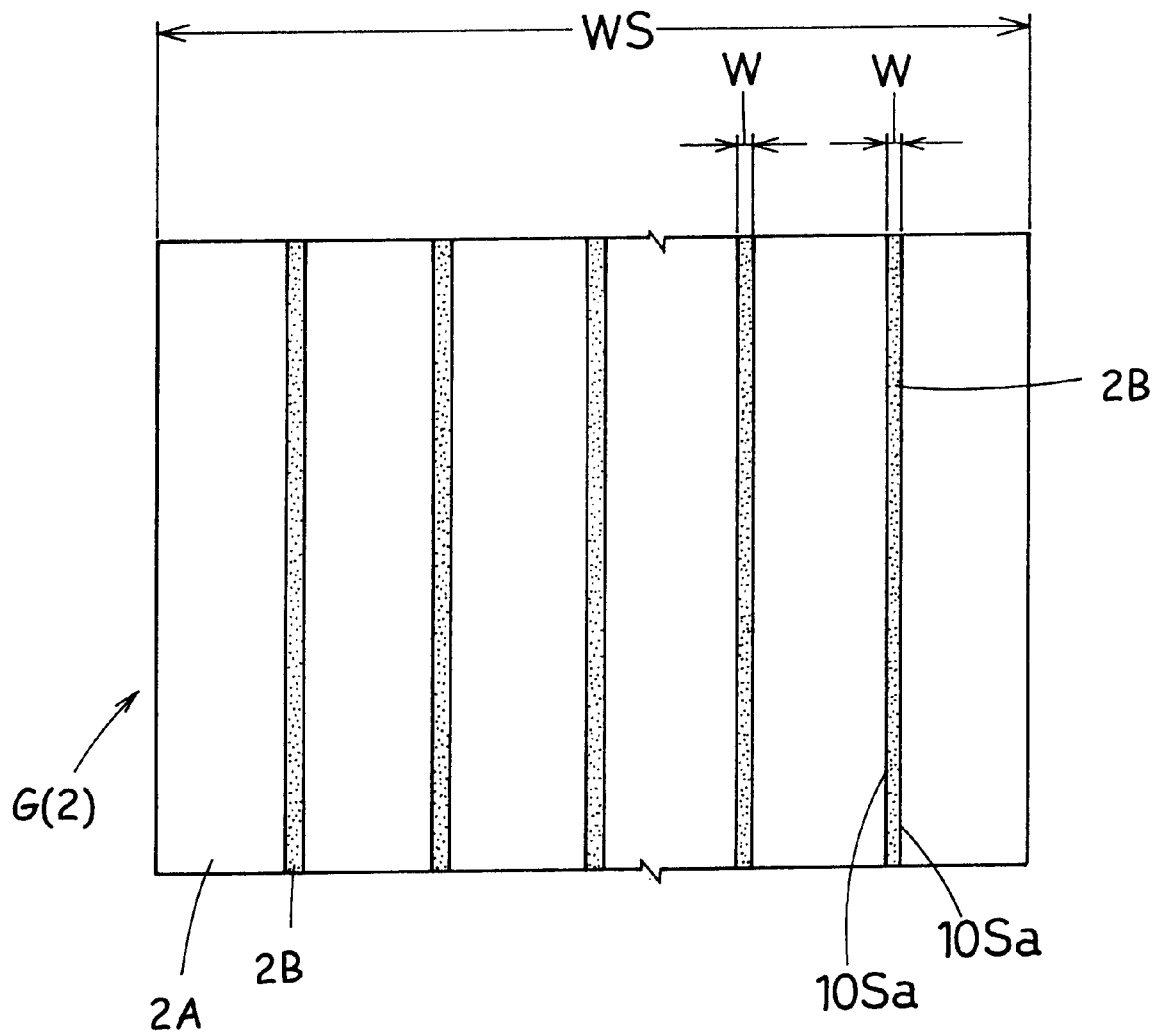
FIG. 2 is a plan view of an example of the tread rubber.

The above-mentioned tread rubber G is, from the outer surface S to a certain depth, composed of wide parts 2A made of the carbon-black-reinforced rubber composition G1 and narrow parts 2B made of the silica-reinforced rubber composition G2, which wide parts 2A and narrow parts 2B are arranged alternately in the widthwise direction (tire axial direction) and extend continuously in the longitudinal direction (tire circumferential direction) as shown in FIG. 2.

The wide parts 2A and narrow parts 2B are basically continuous in the circumferential direction. But, this does not mean to exclude tread grooves which intersect these parts 2A, 2B. In the tread portion 2, therefore, circumferential grooves and/or axial grooves can be provided to form various tread pattern.

Usually, the wide parts 2A and narrow parts 2B extend across the full thickness of the tread rubber G from the outer surface to the inner surface as shown in FIGS. 3(A) and 3(B). Thus, in these examples, both the wide parts 2A and narrow parts 2B extend from the tread face S to the belt 7.

However, as shown in FIG. 3(C), it is possible to terminate the narrow parts 2B at a depth H which is smaller than the full thickness of the tread rubber G so that the inner end is spaced apart from the belt 7. In this case, the depth H is preferably set in a range of not less than 80% of the tread groove depth H1. Here, the tread groove depth H1 is defined as of the deepest tread groove. Thus, in this example, the wide parts 2A extend from the tread face S to the belt 7, but the narrow parts 2B ends before the belt 7.

As shown in FIG. 3(A), the narrow parts 2B can be a substantially constant width from the outer end to the inner end. It is however preferable that the width gradually increases from the outer end towards the inner end as shown in FIG. 3(B), whereby a deterioration in the wet grip performance due to the tread groove volume decreased by tread wear in use can be made up therewith.

In any case, the axial width W of each narrow part 2B is set in a range of from 0.5 to 1.5 mm on the tread surface.

The number N of the narrow parts 2B is set in a range of from 3 to 11, and the number of the wide parts 2A is N+1.

Preferably, the total ΣW of the widths W of all the narrow parts 2B is set in a range of from 1.5 to 6.0 mm. Further, the total ΣW is preferably set in a range of from 10 to 30% of the actual ground contacting width. Here, the actual ground contacting width equals the tread width WS minus the total axial width of tread grooves. The tread width WS is the maximum axial width of the ground contacting area under a standard condition in which the tire is mounted on a standard rim and inflated to a standard pressure and then loaded with a standard load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, as the standard pressure, 180 kPa is used.

In this example, the narrow parts 2B are formed in a straight configuration on the tread face. However, it is also possible to form the narrow parts such that the side edges 10Sa of each narrow part are the same shapes or alternatively different shapes, e.g. straight, zigzag and/or wavy shapes.

The narrow parts in this example are arranged equally or equidistantly in the tire axial direction, but it is also possible to arrange unequally, taking the ground pressure distribution into consideration.

If the loss tangent (tan δ) of the carbon-black-reinforced rubber composition G1 is less than 0.200, it is difficult to obtain a good dry grip performance. If the peak temperature at which the loss tangent becomes maximum is higher than −10 degrees C., the resistance to wear decreases. If the peak temperature is lower than −30 degrees C., the dry grip performance is liable to lower.

If the axial width W of each narrow part 2B is less than 0.5 mm, the wet grip performance can not be improved. If the width W is more than 1.5 mm, a difference in wear between the narrow parts and wide parts is liable to become noticeable.

If the number of the narrow parts is less than 3, it is impossible to improve the wet grip performance. If the number of the narrow parts is more than 11, the dry grip performance is liable to lower.

If the silica-reinforced rubber composition comprises more than 20 parts by weight of the carbon black, the silica is, hindered from displaying its function. If less than 3 parts by weight, the resistance to wear decreases, and partial wear is caused in the narrow parts. On the other hand, if the silica exceeds 100 parts by weight, it becomes difficult to use the adequate amount of carbon black, and in particular the weatherproof greatly decreases.

Comparison Tests

Test tires of size 175/70R13 having the same structure shown in FIG. 1 except for the tread rubber were made and tested for the dry grip performance, wet grip performance and appearance (wear).

The tire specifications and test results are shown in Table 1. The rubber compositions used in the wide parts and narrow parts are shown in Table 2.

Dry Grip and Wet Grip Performance Test

A passenger car which was provided on all the wheels with test tires inflated to a maximum pressure was run on a dry asphalt road at a speed of 64 km/h to obtain the maximum frictional coefficient μmax. Further, the passenger car was run on a wet asphalt road provided with a about 5 mm depth water pool at a speed of 64 km/h to obtain the maximum frictional coefficient μmax. The results are indicated by an index based on Reference tire 1 being 100. The larger the value, the better the performance.

Appearance Test

After running for 8000 km in an accelerated condition corresponding to twice the actual service condition, the test tires were checked for the appearance. If a difference in wear was not observed between the wide parts and narrow parts, it was evaluated as "Good". If a difference was observed, it was evaluated as "Poor".

TABLE 1

| Tire | Ref. 1 | Ex. 1 | Ref. 2 | Ref. 3 | Ref. 4 | Ref. 5 | Ref. 6 |
|---|---|---|---|---|---|---|---|
| Wide parts | | | | | | | |
| Rubber composition | 1 | 1 | 1 | 1 | 2 | 3 | 1 |
| Narrow parts | | | | | | | |
| Rubber composition | — | 4 | 4 | 4 | 4 | 4 | 5 |
| Width W (mm) | 0 | 1.3 | 2.5 | 1.3 | 1.3 | 1.3 | 1.3 |
| Number N | 0 | 6 | 6 | 15 | 6 | 6 | 6 |
| Test results | | | | | | | |
| Dry grip performance | 100 | 100 | 100 | 92 | 90 | 92 | 98 |
| Wet grip performance | 100 | 106 | 100 | 106 | 95 | 103 | 98 |
| Appearance | Good | Good | Poor | Good | Good | Good | Good |

TABLE 2

| Rubber composition | 1 | 2 | 3 | 4 | 5 |
|---|---|---|---|---|---|
| Base rubber material | | | | | |
| NR | 40 | 50 | 40 | 40 | — |
| S-SBR (*1) | — | — | — | 40 | — |
| S-SBR (*2) | 60 | — | 60 | — | 100 |
| E-SBR (*3) | — | 50 | — | — | — |
| BR(*4) | — | — | — | 20 | — |
| Reinforcing agent | | | | | |
| Silica (*5) | — | — | — | 60 | — |
| Carbon (*6) | 75 | 75 | — | 10 | 60 |
| Carbon (*7) | — | — | 45 | — | — |
| Oil | 40 | 25 | 22.5 | 25 | 25 |
| Silane coupling (*8) | — | — | — | 4.8 | — |
| tan δ | 0.28 | 0.23 | 0.15 | 0.14 | 0.23 |
| peak temperature (deg. C.) | −12 | −40 | −12 | — | −30 |

*1 Non-oil-extended S-SBR: styrene 15%, vinyl 57% (NIHON GOUSEI GOMU, SL574)
*2 Non-oil-extended S-SBR: styrene 20%, vinyl 60% (HINON ZEON, NS116)
*3 Non-oil-extended E-SBR: styrene 23.5%, vinyl 18% (SUMITOMO KAGAKU, SBR1502)
*4 High-cis BR: cis form 98% (NIHON ZEON, BR1220)
*5 Silica: BET 175 sq.m/g. DBP 210 ml/100g (DEGUSSA, ULTRASIL VN-3)
*6 Carbon black: Primary particle diameter 16 nm (MITSUBISHI KAGAKU)
*7 Carbon black: Primary particle diameter 28 nm (SHOWA CABOT, N351)
*8 vis( triethoxysilylpropyl) tetrasulfide (DEGUSSA, Si69)

What is claimed is:

1. A vehicle tire comprising a tread rubber forming a ground contacting face of the tire, said tread rubber, in a range from the ground contacting face to a certain depth, comprising circumferentially extending wide parts made of a carbon-black-reinforced rubber composition and circumferentially extending narrow parts made of a silica-reinforced rubber composition, which wide parts and narrow parts alternate in the tire axial direction, the axial width of each said narrow part being in the range of from 0.5 to 1. mm, and the number of the narrow parts counted across a ground contacting width of the ground contacting face being in a range of from 3 to 11, wherein a loss tangent of the carbon-black-reinforced rubber composition is not less than 0.200 at a temperature of 70 degrees C., and a peak temperature at which the loss tangent becomes maximum is in a range of from −30 to −10. degrees C., and the silica-reinforced rubber composition comprises 100 parts by weight of diene rubber as its base rubber material, 30 to 100 parts by weight of silica, and 3 to 20 parts by weight of carbon black.

2. The vehicle tire according to claim 1, wherein the narrow parts extend straight in the tire circumferential direction.

3. The vehicle tire according to claim 2, wherein each said narrow part has a variable width increasing from the radially outer end to the radially inner end.

4. The vehicle tire according to claim 2, wherein each said narrow part has a variable width increasing from the radially outer end to the radially inner end.

5. The vehicle tire according to claim 2, wherein the wide parts and narrow parts extend across the full thickness of the tread rubber.

6. The vehicle tire according to claim 2, wherein each said narrow part terminate in the course of the thickness of the tread rubber.

7. The vehicle tire according to claim 1, wherein each said narrow part has a substantially constant width from the radially outer end to the radially inner end.

8. The vehicle tire according to claim 1, wherein each said narrow part has a variable width increasing from the radially outer end to the radially inner end.

9. The vehicle tire according to claim 1, wherein the wide parts and narrow parts extend across the full thickness of the tread rubber.

10. The vehicle tire according to claim 1, wherein each said narrow part terminated in the course of the thickness of the tread rubber.

* * * * *